(12) United States Patent
Castillo et al.

(10) Patent No.: US 7,970,884 B1
(45) Date of Patent: Jun. 28, 2011

(54) DISTRIBUTION OF INTERMEDIATE DATA IN A MULTISTAGE COMPUTER APPLICATION

(75) Inventors: Claris Castillo, White Plains, NY (US);
Mike Spreitzer, Croton On Hudson, NY (US); Malgorzata Steinder, Leonia, NJ (US); Asser N. Tantawi, Somers, NY (US); Ian N. Whalley, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/684,273

(22) Filed: Jan. 8, 2010

(51) Int. Cl.
*G06F 15/173* (2006.01)
(52) U.S. Cl. ............... 709/223; 709/201; 709/224
(58) Field of Classification Search .......... 709/201, 709/223, 224, 220
See application file for complete search history.

(56) References Cited

U.S. PATENT DOCUMENTS

| | | | |
|---|---|---|---|
| 5,978,588 A | 11/1999 | Wallace | |
| 6,381,735 B1 | 4/2002 | Hunt | |
| 6,591,262 B1 * | 7/2003 | MacLellan et al. | 718/104 |
| 7,370,328 B2 * | 5/2008 | Yamada et al. | 709/224 |
| 7,461,236 B1 | 12/2008 | Wentzlaff | |
| 7,490,218 B2 | 2/2009 | Eggers et al. | |
| 2002/0194603 A1 * | 12/2002 | Connelly | 725/46 |
| 2005/0166205 A1 | 7/2005 | Oskin et al. | |
| 2006/0212597 A1 * | 9/2006 | Shimada | 709/238 |
| 2008/0120592 A1 * | 5/2008 | Tanguay et al. | 717/104 |
| 2008/0175270 A1 * | 7/2008 | Kataria et al. | 370/412 |
| 2009/0241117 A1 * | 9/2009 | Dasgupta et al. | 718/101 |
| 2009/0285228 A1 * | 11/2009 | Bagepalli et al. | 370/412 |

OTHER PUBLICATIONS

Qingchun-et al.; Throughput and Energy-Efficiency-Aware Protocol for Ultrawideband Communication in Wireless Sensor Networks. . . INSPEC/IEEE; pp. 805-816; 2008-05.
Venugopal-et al.; "A Taxonomy of Data Grids for Distributed Data Sharing, Management, and Processing"; ACM Digital Library; 2006.
Baradaran-et al.; "A Compiler Approach to Managing Storage and Memory Bandwidth in Configurable Architectures"; ACM Digital Library: vol. 13, No. 4, Article 61, Sep. 2008.

* cited by examiner

*Primary Examiner* — Philip B Tran
(74) *Attorney, Agent, or Firm* — Ido Tuchman; Preston J. Young

(57) ABSTRACT

A method, system and computer program product for distributing intermediate data of a multistage computer application to a plurality of computers. In one embodiment, a data manager calculates data usage demand of generated intermediate data. A computer manager calculates a computer usage, which is the sum of all data usage demand of each stored intermediate data at the computer. A scheduler selects a target computer from the plurality of computers for storage of the generated intermediate data at such that a variance of the computer usage demand across the plurality of computers is minimized.

20 Claims, 6 Drawing Sheets

DISTRIBUTION OF INTERMEDIATE DATA IN A MULTISTAGE COMPUTER APPLICATION

BACKGROUND

In general online scheduling algorithms for dataflows aim at minimizing makespan and make scheduling decisions based on the requirement of the dataflow and the state of resources in the system. A few of such factors are: data dependency among tasks, deadline requirement, storage and compute capacity of machines. Furthermore, since running time of makespan can be dominated by the time incurred by transferring data, most scheduling algorithm aim at procuring data-locality, i.e., collocation of tasks and their corresponding input data. As a result, the quality of the schedules produced by the scheduler is greatly influenced by the state of the resources, and more specifically, by the placement of data.

SUMMARY

An example embodiment of the invention is a method for distributing data of a multistage computer application to a plurality of computers. The method includes determining a data usage demand of a generated intermediate data. The data usage demand is proportional to the number of consuming tasks in the multistage computer application configured to consume the generated intermediate data and, for each consuming task, and is discounted by a distance between a current stage of the multistage computer application and a future stage of the multistage computer application executing the consuming task.

The method further includes a calculating step to calculate a computer usage demand for each computer in the plurality of computers. The computer usage demand is a sum of all data usage demand of each intermediate data stored in local memory at the computer. A storing operation stores the generated intermediate data at local memory of at least one target computer of the plurality of computers such that a variance of the computer usage demand across the plurality of computers is minimized.

Another example embodiment of the invention is a system for distributing intermediate data of a multistage computer application to a plurality of computers. The system includes a data manager, a computer manager, and a scheduler.

The data manager is configured to calculate, by at least one computer processor, a data usage demand of a generated intermediate data. The data usage demand is proportional to the number of consuming tasks in the multistage computer application configured to consume the generated intermediate data and, for each consuming task, is discounted by a distance between a current stage of the multistage computer application and a future stage of the multistage computer application executing the consuming task.

The computer manager is configured to calculate a computer usage demand for each computer in the plurality of computers. The computer usage demand is a sum of all data usage demand of each intermediate data stored in local memory at the computer.

The scheduler is configured to select at least one target computer of the plurality of computers for storage of the generated intermediate data at local memory such that a variance of the computer usage demand across the plurality of computers is minimized.

Another embodiment of the invention is computer program product for distributing intermediate data of a multistage computer application to a plurality of computers. The computer program product may include computer readable program code configured to calculate a data usage demand of a generated intermediate data, calculate a computer usage demand for each computer in the plurality of computers, and store the generated intermediate data at local memory of at least one target computer of the plurality of computers such that a variance of the computer usage demand across the plurality of computers is minimized.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-9.

Figure 1:
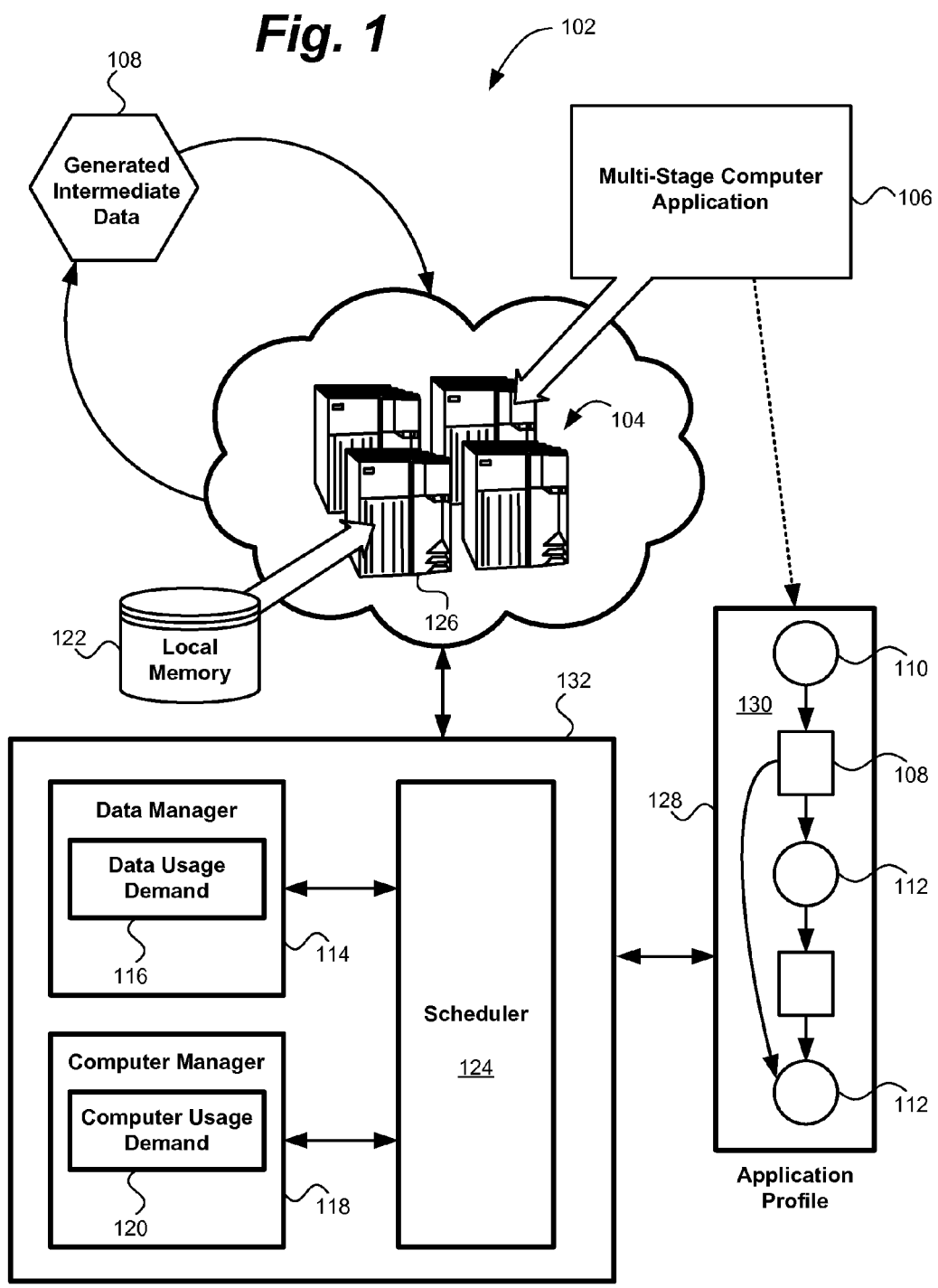
FIG. 1 shows an example system 102 employing the present invention.

FIG. 1 illustrates an example system 102 incorporating an embodiment of the present invention. It is noted that the system 102 shown is just one example of various arrangements of the present invention and should not be interpreted as limiting the invention to any particular configuration.

The system 102 includes a plurality of computers 104 executing a multistage computer application 106 in a computer network. For example, the plurality of computers 104 may be part of a cloud computing structure.

A multistage computer application refers to a computer application that executes a plurality of tasks in stages successively over time. The multistage computer application 106 generates intermediate data 108. As used herein, intermediate data 108 is data generated by one stage 110 of the multistage computer application and transferred to one or more following stages 112.

The system 102 also includes a placement service 132 for distributing the intermediate data 108 to the plurality of computers 104.

The placement service 132 may include a data manager 114 configured to calculate, by at least one computer processor, a data usage demand 116 of the generated intermediate data 108. As described more fully below, in one embodiment the data usage demand 116 is proportional to the number of consuming tasks in the multistage computer application 106 configured to consume the generated intermediate data 108. For each consuming task, the data usage demand 116 is discounted by a distance between a current stage 110 of the multistage computer application and a future stage 112 of the multistage computer application 116 executing the consuming task.

For example, the data usage demand 116 may be calculated as follows:

$$v_i^t = \sum_{t \in C_i^t} \frac{w_j r_j}{w_0 + W_{p(i,j)}},$$

where $w_j$ is work associated with task $t_j$, $r_j$ is an expected number of executions of task $t_j$, $W_{p(i,j)}$ is a total amount of work left in a longest path from the generated intermediate data to $t_j$, $c_i^t$ are consumers of the generated intermediate data at time t, and $w_0$ is a constant.

The placement service 132 may further include a computer manager 118 configured to calculate a computer usage demand 120 for each computer in the plurality of computers 104. As described more fully below, in one embodiment the computer usage demand 120 is a sum of all data usage demand 116 of each intermediate data stored in local memory 120 of the computer.

The placement service 132 may further include a scheduler 124. The scheduler 124 is configured to select at least one target computer 126 of the plurality of computers 104 for storage of the generated intermediate data 108 at local memory 122 such that a variance of the computer usage demand 120 across the plurality of computers 104 is minimized. In one embodiment, the scheduler 124 is configured to select the target computer 126 of the plurality of computers 104 having the lowest computer usage demand 120.

The system 102 may include an application profile 128 configured to provide the data manager 114 a communication pattern 130 of the generated intermediate data. The communication pattern 130 specifies usage of the generated intermediate data 108 by task and runtime. In one embodiment, the communication pattern 130 is a directed acyclic graph (DAG).

The application profile 128 may also be communicated to the scheduler 124. As discussed further below, the scheduler 124 may select one or more of the plurality of computers 104 having a plurality of processing cores if the generated intermediate data 108 is consumed simultaneously by a plurality of tasks. In another embodiment further described below, the scheduler is further configured to select one or more of the plurality of computers 104 to store the generated intermediate data 108 and other intermediate data together if the generated intermediate data 108 is consumed simultaneously with the other intermediate data by one single task.

The computer manager 118 may be configured to normalize the computer usage demand 120 based on computing resources available at each computer in the plurality of computers 104. The computing resources include, for example, the memory size and the amount of processing cores at a computer.

The example system 102 beneficially drives the state of resources in a distributed computing system so to enable/promote data-locality when placing computation (tasks) for dataflows. This is achieved by making data placement decisions such that when placing a ready task, the machine hosting its corresponding intermediate data is likely to have enough resources available to be selected by the scheduler 124. This results in reduced transfer cost since intermediate data objects do not need to be transferred remotely for processing.

The data usage demand 116 (also referred to herein as dataUsageValue for brevity) metric represents the discounted expected amount work of a given intermediate data object at a given point in time. Note that for a given intermediate data object this metric has a relative nature in that it captures its future demand or importance when compared to other intermediate data objects stored in the system at a given point in time. Since an intermediate data object can be accessed by multiple tasks at different times throughout the execution of a dataflow, data usage demand 116 varies over time. As a matter of fact, for a given intermediate data object its data usage demand 116 is recomputed every time a task consumes it and its value is updated to reflect how soon/far in the future it is needed later by another task in the dataflow. The introduction of this metric leads to the introduction of two additional related metrics, namely: computer usage demand 120 (per machine) (also referred to herein as machineUsageValue for brevity) and system usage demand (also referred to herein as systemUsageValue for brevity) which represent an aggregate of the data objects stored in each machine and in the whole system, respectively.

In one embodiment, as long as system usage demand is evenly distributed across machines in the system, i.e., minimum variance for computer usage demand 120 values, machines storing intermediate data needed by ready tasks are likely to have enough resources to host the tasks. Similarly, in the case of placing multiple replicas to handle system failures, the data usage demand 116 should reflect the reliability of the system (e.g., failure probability). Thus, in one embodiment, the system 102 aims at maximizing data locality in the presence of system failures.

Embodiments of the present invention are now discussed in more detail. The reader is referred to Table 1 for a list of term and their corresponding meanings.

$$v_i^t = \sum_{t \in C_i^t} \frac{w_j r_j}{w_0 + W_{p(i,j)}}$$

TABLE 1

| Terminology | |
|---|---|
| $m_k$ | machine with compute and memory resources |
| Data-flow (j) | dataflow job consisting of multiple dependent tasks represented as a DAG |
| Task ($t_i$) | task belonging to dataflow j |
| Intermediate data set ($d_i$) | intermediate input data set for some task (s) |
| dataUsageValue ($v_i$) | value associated with $d_i$ representing the likelihood that $d_i$ will be needed for processing by a task in the future |
| machineUsageValue ($V_k$) | value associated with $m_k$ representing the share of systemUsageValue |
| systemUsageValue ($\overline{V}$) | systemUsageValue |
| Set of dependent tasks ($T_i$) | set of tasks that depend on, ie., consume, $d_i$ |
| $D_k$ | set of intermediate data objects stored in $m_k$ |
| $EST_t(T_i)$ | sorted set of the earliest starting time of the earliest dependency task in $T_i$ at time t |
| Set $F_i^t$ of dependent tasks | subset of $T_i$ containing all the tasks that have completed at time t |
| Set $C_i^t$ of dependent tasks | subset of $T_i$ containing all the tasks that have not ran yet at time t ($T_i - F_i^t$) |

TABLE 1-continued

Terminology

| | |
|---|---|
| $w_j$ | amount work associated with task $t_j$ |
| $r_j^t$ | number of times task $t_j$ is expected to run ($r_j^t > 1$) |
| $W_{p(i,j)}$ | aggregate amount of work of the maximum path length between task $t_i$ and $t_j$ |
| $R_{i,k}$ | $k_{th}$ replica of $d_i$ |

Figure 2:
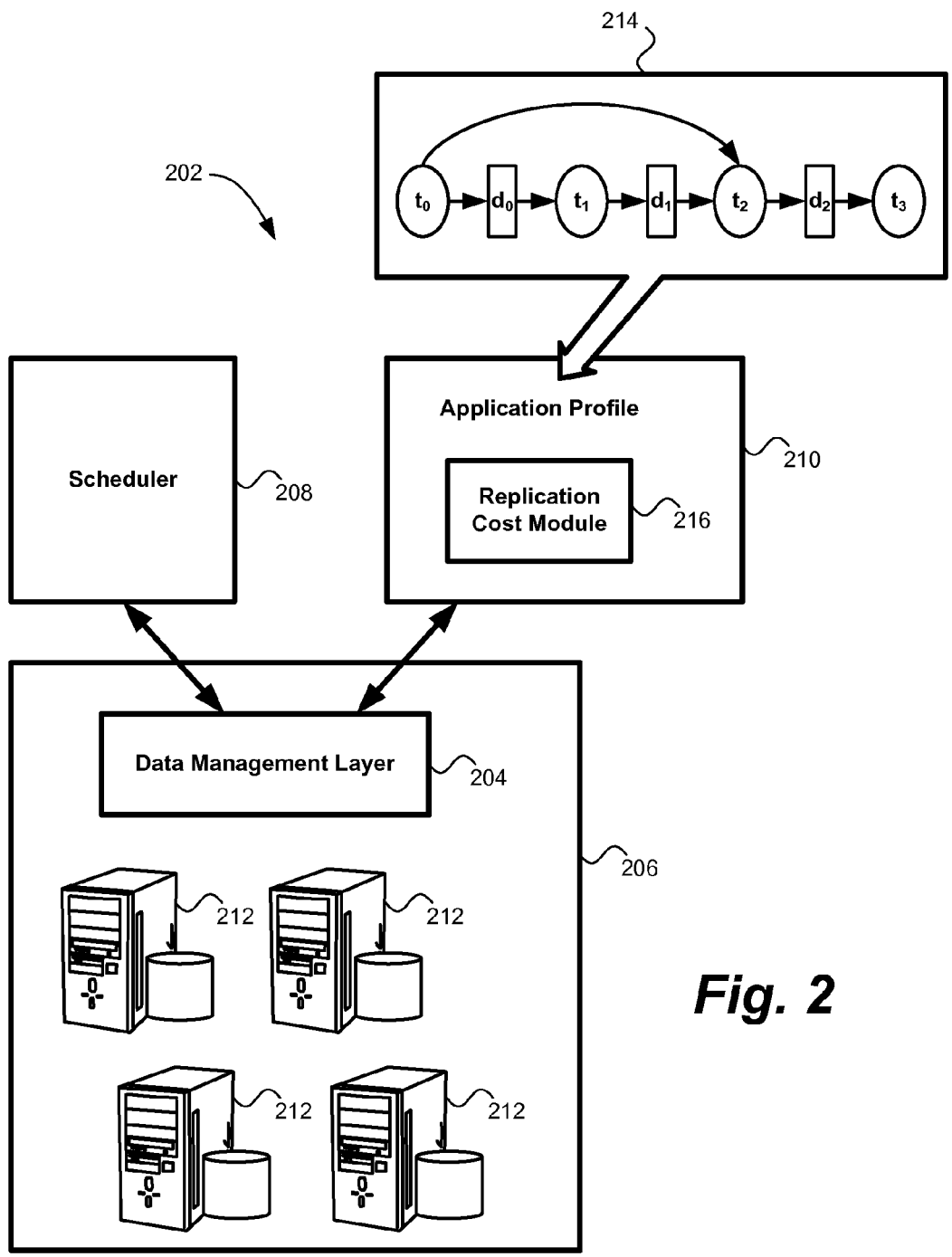
FIG. 2 shows another example system 102 employing the present invention.

Turing now to FIG. 2, an example system 202 is shown consisting of a data management layer 204 that sits insides the resource management layer 206 in between the scheduler 208 and the application profiler 210, and the resources 212. As shown, the application profiler 210 receives as input the directed acyclic graph (DAG) 214 describing the job and run time information from the resource management layer.

An element of the application profiler 210 is the replicate cost model 216 which decides when to replicate intermediate data. Copies of intermediate data objects are treated differently in that their dataUsageValue are computed differently.

The data management layer 204 makes data placement decision based on the information obtained from the application profiler 210. For instance, it seeks at collocating intermediate data objects as specified by the communication pattern of the DAG 214 and creates as many replicas as determined by the RCM. As the data management layer 204 makes placement decisions it leads the scheduler 208 to make better scheduling since it effectively improves the choices available to it when placing computation.

In one embodiment, the data management layer 204 consists of three main steps:

1. Computing and Assigning dataUsageValue $v_i^t$: assigning/tagging a dataUsageValue $v_i^t$ to every intermediate data object $d_i$ stored in the system. Recall that $v_i^t$ represents the discounted expected amount of work associated with $d_i$, i.e., the amount of work left to be done by the tasks in $T_i$ that have not ran yet, when compared to other intermediate data objects in the system at time t. Since an intermediate data object $d_i$ may be needed multiple times throughout the life time of j, $v_i^t$ varies over time and becomes zero ($v_i$=0) when it is no longer needed. Intuitively, the higher the demand of $d_i$ in the future the higher the value.

2. Computing and Assigning machineUsageValue $V_k^t$: assigning/tagging a machineUsageValue $V_k^t$ to each machine $m_k$ in the system. $V_k^t$ represents the share of the total systemUsageValue $\nabla$ stored in machine $m_k$ and is an aggregate of the dataUsageValues $v_i^t$ for all $d_i \in D_k$ at time t.

3. Data Placement: placing new incoming $d_i$ following a heuristic that seeks to even the distribution of $v_i^t$ across machines in the system and achieve the goals stated earlier.

Two cases are considered when computing $v_i^t$:

1. Communication pattern of the dataflow:

The dataUsageValue $v_i$ is assigned at the time $d_i$ is created and stored for the first time and it varies over time as $d_i$ is consumed/processed by the tasks that depend on it ($T_i$). The update mechanism for the dataUsageValue is described below. It is easy to observe that every intermediate data object $d_i$ in a dataflow j is processed by at least one task in j, i.e., immediate child task. Depending on the communication pattern of j, however, an intermediate data object may be processed by more than one task, e.g., higher fan-in.

Figure 3:
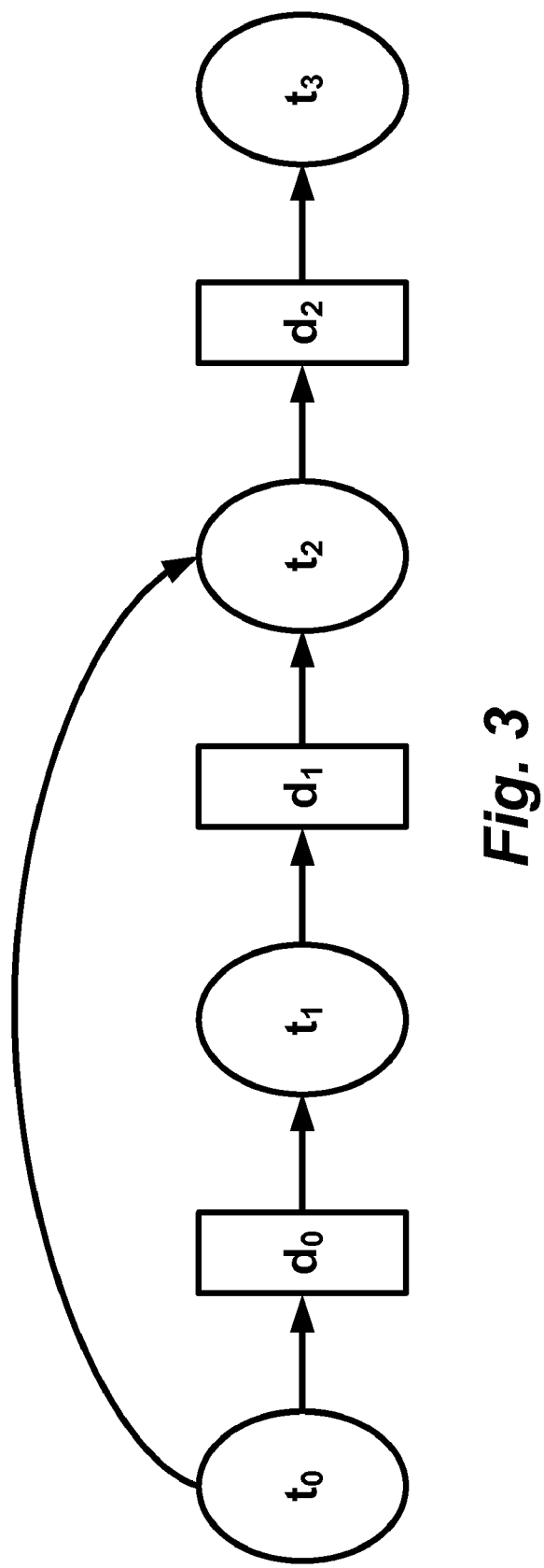
FIG. 3 shows an example communication pattern of generated intermediate data from a multistage computer application.

For instance, in FIG. 3, $d_0$ is needed by two tasks, $t_1$ (immediate child of $t_0$) and $t_2$ (farther in the future). Thus, after $t_1$ finishes at time t1, $V_0^{t1}$ is updated to reflect the fact that $t_1$ completed and there is less work left associated to $d_0$. In this case only t2 is left for processing $d_0$. Note that $v_1^{t2} \to 0$ on the other hand as soon as $t_2$ finishes (at t=t2) to reflect the fact that $d_1$ is no longer needed by the dataflow.

2. Re-execution of a task in the presence of system failure:

As described earlier a replica corresponding to an intermediate data object $d_i$ may be needed for re-execution if one of the resources hosting a task fails and the last checkpoint of the dataflow corresponds to $d_i$. Following the same principle stated for the previous case, $v_i^t$ is computed for $d_i$ considering the probability of system failure and hence, of the replica been needed for re-execution of a task. Furthermore, to recognize the aggregated importance of all the replicas, $v_i^t$ is equally distributed across the replicas. Note that $v_i^t$ is in this case a function of the reliability of the dataflow, i.e., a function of several other factors such as the probability of failure of resources executing tasks belonging to the dataflow and number of replicas available for $d_i$.

It is noted that there are multiple ways to obtain $v_i^t$. In one embodiment, $G_t(d_i)$ is a function that computes $v_i^t$ at time t and satisfies the definition stated earlier. One example of this function is:

$$G_t(d_i) = \sum_{t \in C_i^t} \frac{w_j r_j^t}{w_0 + W_{p(i,j)}},$$

where $w_0$ is a constant that can changed depending on the state of the system and workloads. For the sake of easing the explanation, let us assume that a unit of work takes one unit of time to execute. Intuitively, the denominator in the equation reflects how far in the future is task $t_j$ is expected to execute. The smaller the denominator, the larger the value of $v_i$. Thus, this suggests that tasks that are expected to run soon have more weight in the placement decision made at time t. This follows intuition since the compute resources needed to execute the task may be needed soon in the future (and therefore must be available). If we now consider the numerator, it reflects the amount of work associated with task $t_j$ including the number of times that is expected to run($r_j^t$). The introduction of the term $r_j^t$ is important since it allows us to capture the likeliness that the system fails and therefore a data set may needed again in the future. In one embodiment, to assign $v_i^t$ to N replicas of $d_i$ the value of $v_i^t$ is evenly distributed. That is, $$v_{Ri,j}^t = \frac{v_i^t}{N}.$$

Following these observations, the larger the numerator the higher the value of $v_i$ suggesting that resources where $d_i$ has been placed should be treated carefully to avoid over committing them.

The value of $V_k^t$ can be determined in several ways. To illustrate, consider a very simple approach, that is, $V_k = \Sigma_j v_j | d_j \in D_k$. Intuitively, the higher the value of $V_k^t$ the more likely that $m_k$ will be needed by tasks in j soon. In other words, placing a task in a machine $m_k$ with high value of $V_k^t$ comes at the cost of achieving limited data locality by having to place incoming tasks that depend on data held in $m_k$ into a remote machine.

In one embodiment, a simple heuristic is used to ensure the even distribution of $V_k^t$ across machines. When making the decision of placing a new incoming $d_i$ the algorithm selects the machine with the smallest value of $V_k^t$. Intuitively, the smaller the value of $V_k^t$ the less likely that machine $M_k$ will be needed, and its value will be reduced. By considering this product we aim at minimizing the likelihood that a placement decision made at time t1 in $m_k$ will be invalidated by changes in $V_k^t$, t1<t. In other words, that a machine will be overcommitted by the time $d_i$ is needed.

Recall that the data management layer can use a priori knowledge regarding the communication pattern of the DAG corresponding to j to identify opportunities for collocating data and hence maximizing data-locality. Two especial cases are worth mentioning:

1. Fork dataflow: In the case an intermediate data object has multiple immediate consumers, the data management layer has multiple options. It could for example create as many copies of the intermediate data object as number of consumers and place them individually or it could leverage or keep one single copy and place it in a multi-core machine so to achieve better parallelism and hence, reduce makespan. The data management layer makes these decisions with the help of the application profiler which dictates the requirements of the dataflow.

2. Join dataflow: This refer to the case wherein multiple intermediate data objects generated by different tasks are consumed by one single task. For the purpose of data-locality the data management layer may treat all the intermediate data objects as one and therefore place them together.

Figure 4:
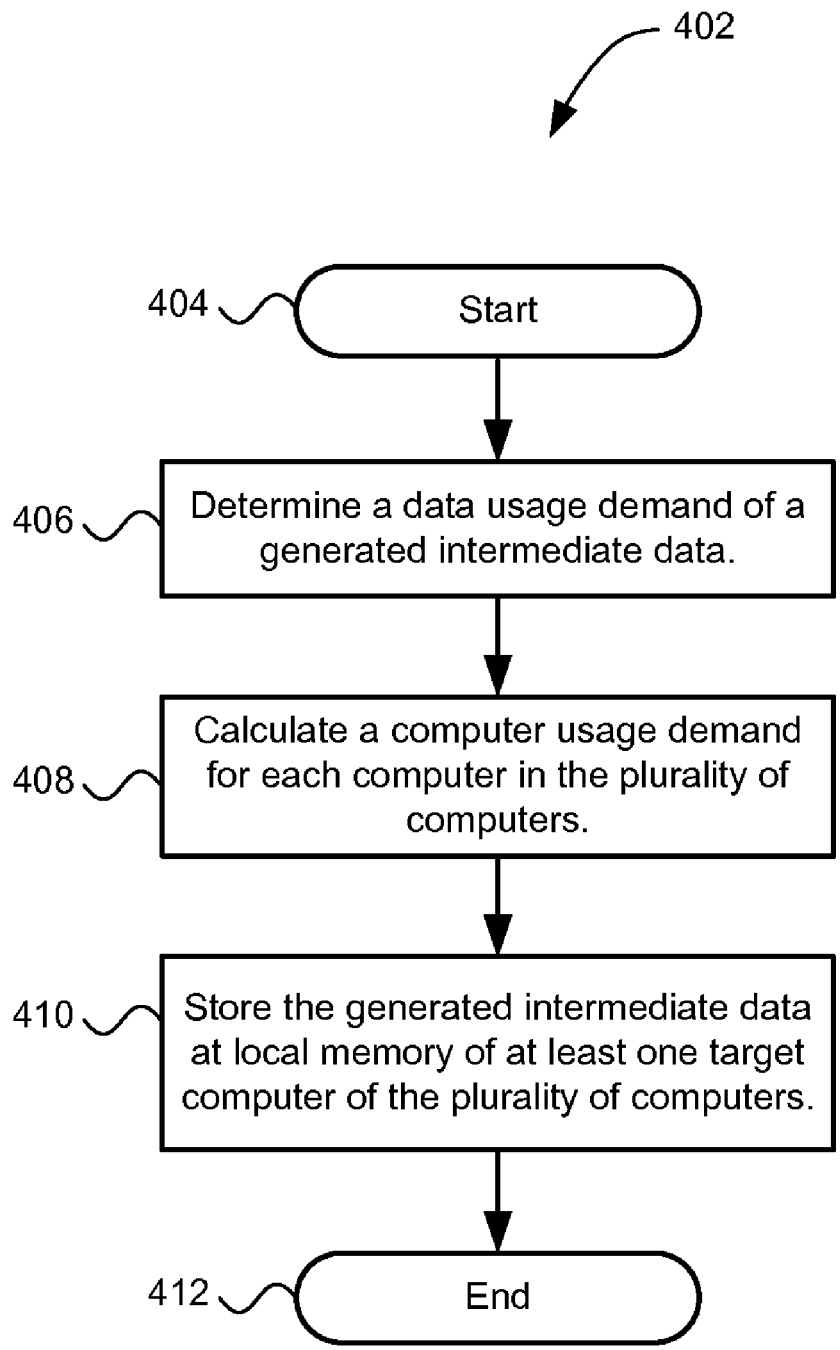
FIG. 4 shows an example flowchart for distributing data of a multistage computer application to a plurality of computers.

Another embodiment of the invention is a method for distributing data of a multistage computer application to a plurality of computers, which is now described with reference to flowchart 402 of FIG. 4. The method begins at Block 404 and includes determining a data usage demand of a generated intermediate data at Block 406. As discussed above, the data usage demand is proportional to the number of consuming tasks in the multistage computer application configured to consume the generated intermediate data and, for each consuming task, discounted by a distance between a current stage of the multistage computer application and a future stage of the multistage computer application executing the consuming task.

In one embodiment of the invention, the data usage demand is calculated as follows:

$$v_i^t = \sum_{t \in C_i^t} \frac{w_j r_j}{w_0 + W_{p(i,j)}},$$

where $w_j$ is work associated with task $t_j$, $r_j$ is an expected number of executions of task $t_j$, $W_{p(i,j)}$ is a total amount of work left in a longest path from the generated intermediate data to $t_j$, $c_i^t$ are consumers of the generated intermediate data at time t, and $w_0$ is a constant.

The method further includes calculating a computer usage demand for each computer in the plurality of computers at Block 408. The computer usage demand is a sum of all data usage demand of each intermediate data stored in local memory at the computer.

Next, at Block 410, the generated intermediate data is stored at local memory of at least one target computer of the plurality of computers such that a variance of the computer usage demand across the plurality of computers is minimized. As detailed above, storing the generated intermediate data may include storing the generated intermediate data at the at least one target computer having the lowest computer usage demand. The method ends at Block 412.

Figure 5:
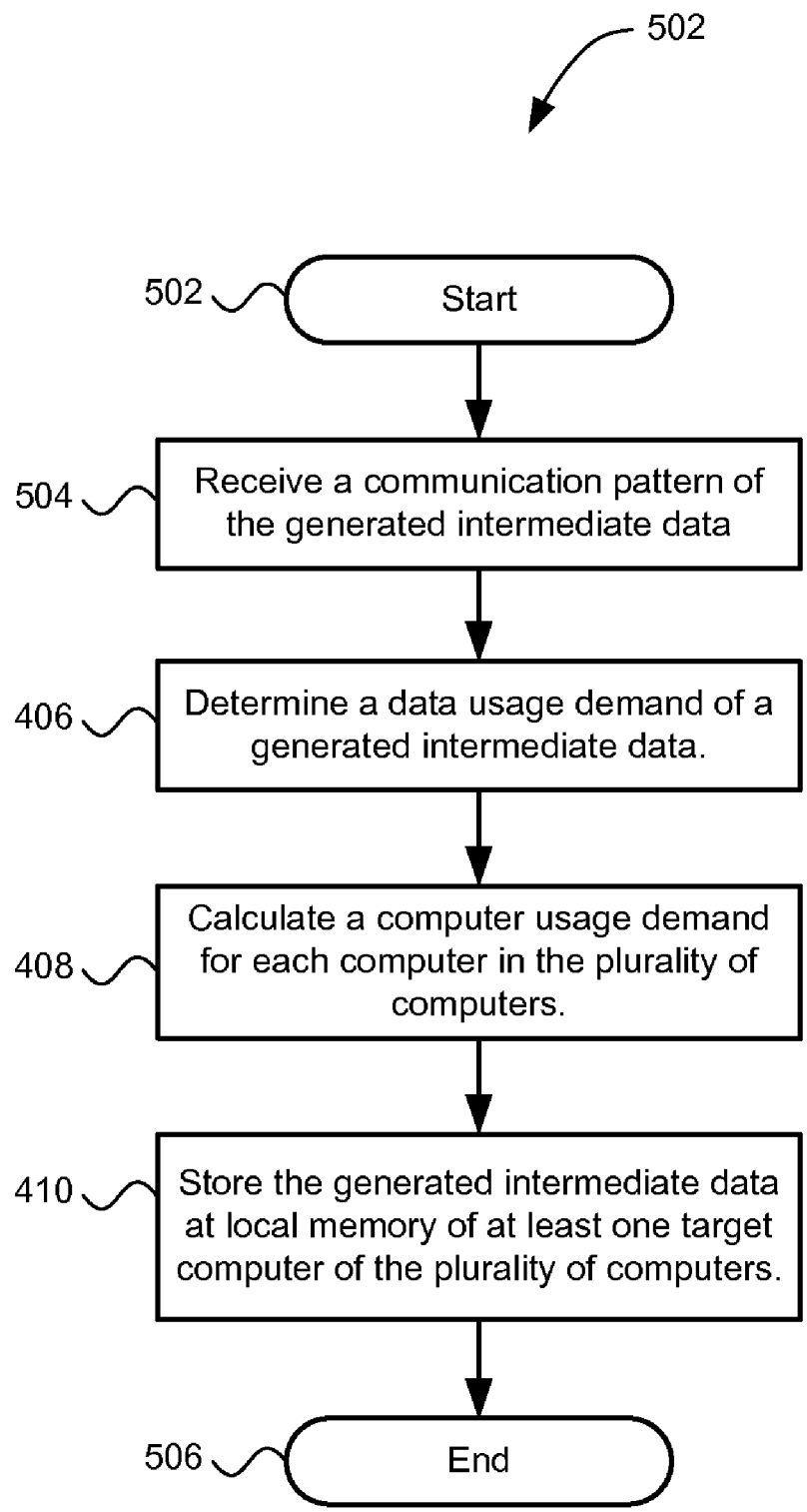
FIG. 5 shows additional operations included in the flowchart of FIG. 4.

In another method embodiment, which is now described with reference to flowchart 502 of FIG. 5, the method begins at Block 504. The method includes receiving a communication pattern of the generated intermediate data. The communication pattern specifies usage of the generated intermediate data by task and runtime. In one embodiment, the communication pattern is a directed acyclic graph. The method may additionally include the steps of FIG. 4 at Blocks 406, 408 and 410. The method ends at Block 506.

Figure 6:
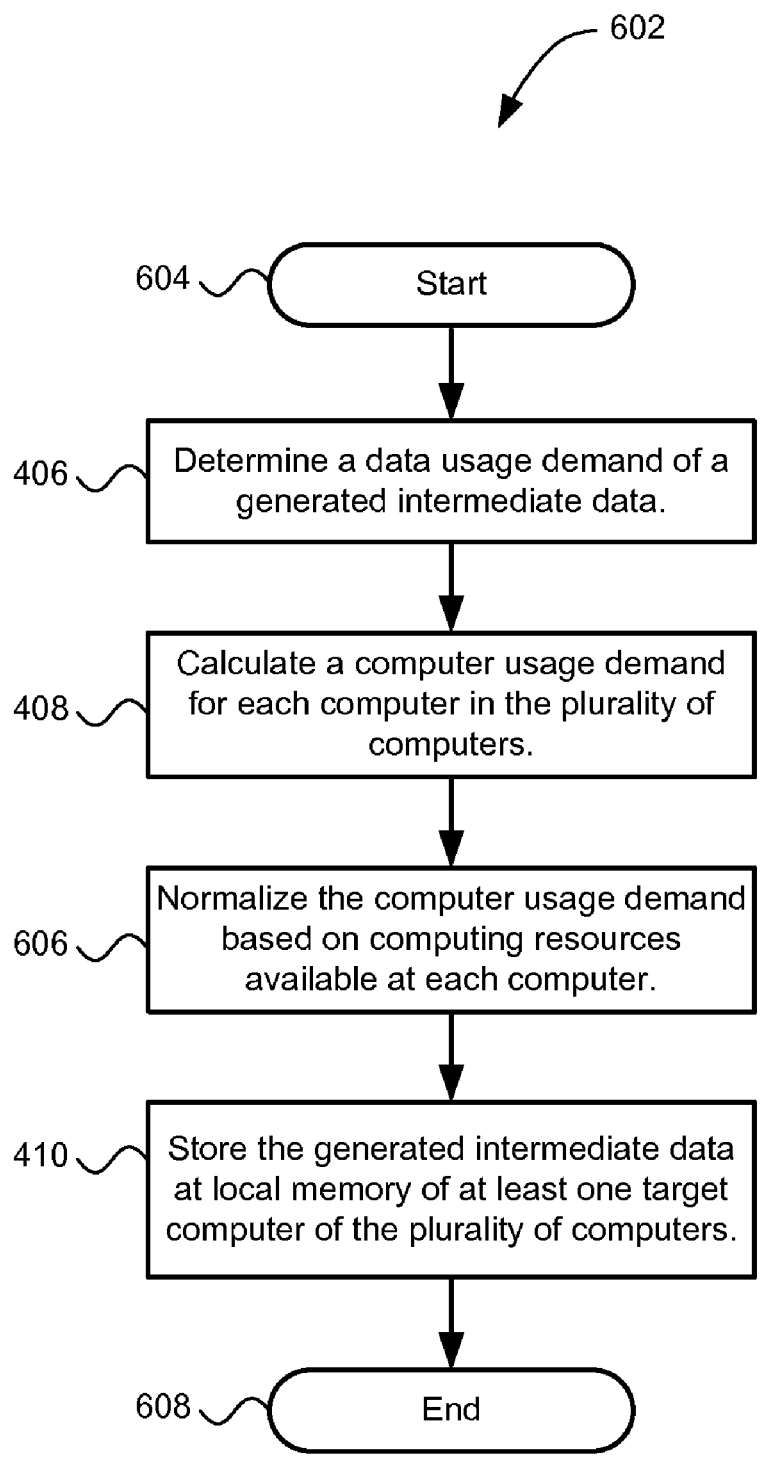
FIG. 6 shows additional operations included in the flowchart of FIG. 4.

In another method embodiment, which is now described with reference to flowchart 602 of FIG. 6, the method begins at Block 604. The method may include the steps of FIG. 4 at Blocks 406, 408 and 410. The method may additionally include normalizing the computer usage demand based on computing resources available at each computer in the plurality of computers at Block 606. The computing resources may include, of example, memory size and amount of processing cores. The method ends at Block 608.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for distributing data of a multistage computer application to a plurality of computers, the method comprising:

determining a data usage demand of a generated intermediate data, the data usage demand being proportional to the number of consuming tasks in the multistage computer application configured to consume the generated intermediate data and, for each consuming task, discounted by a distance between a current stage of the multistage computer application and a future stage of the multistage computer application executing the consuming task;

calculating a computer usage demand for each computer in the plurality of computers, the computer usage demand being a sum of all data usage demand of each intermediate data stored in local memory at the computer; and storing the generated intermediate data at local memory of at least one target computer of the plurality of computers such that a variance of the computer usage demand across the plurality of computers is minimized.

2. The method of claim 1, wherein storing the generated intermediate data includes storing the generated intermediate data at the at least one target computer having the lowest computer usage demand.

3. The method of claim 1, further comprising receiving a communication pattern of the generated intermediate data, the communication pattern specifying usage of the generated intermediate data by task and runtime.

4. The method of claim 3, wherein the communication pattern is a directed acyclic graph.

5. The method of claim 1, further comprising normalizing the computer usage demand based on computing resources available at each computer in the plurality of computers.

6. The method of claim 5, wherein the computing resources include, at least one of, memory size and amount of processing cores.

7. The method of claim 1, further comprising:
   receiving a communication pattern of the generated intermediate data, the communication pattern specifying usage of the generated intermediate data by task and runtime; and
   if the generated intermediate data is consumed simultaneously by a plurality of tasks, storing the generated intermediate data at one or more of the plurality of computers having a plurality of processing cores.

8. The method of claim 1, further comprising:
   receiving a communication pattern of the generated intermediate data, the communication pattern specifying usage of the generated intermediate data by task and runtime; and
   if the generated intermediate data is consumed simultaneously with other intermediate data by one single task, storing the generated intermediate data and the other intermediate data together at the target computer.

9. The method of claim 1, wherein the data usage demand is calculated as follows:

$$v_i^t = \sum_{t \in C_i^t} \frac{w_j r_j}{w_0 + W_{p(i,j)}},$$

where $w_j$ is work associated with task $t_j$, $r_j$ is an expected number of executions of task $t_j$, $W_{p(i,j)}$ is a total amount of work left in a longest path from the generated intermediate data to $t_j$, $c_i^t$ are consumers of the generated intermediate data at time t, and $w_0$ is a constant.

10. A system embedded in a non-transitory computer readable storage medium for distributing intermediate data of a multistage computer application to a plurality of computers, the system comprising:
   a data manager configured to calculate, by at least one computer processor, a data usage demand of a generated intermediate data, the data usage demand being proportional to the number of consuming tasks in the multistage computer application configured to consume the generated intermediate data and, for each consuming task, discounted by a distance between a current stage of the multistage computer application and a future stage of the multistage computer application executing the consuming task;
   a computer manager configured to calculate a computer usage demand for each computer in the plurality of computers, the computer usage demand being a sum of all data usage demand of each intermediate data stored in local memory at the computer; and
   a scheduler configured to select at least one target computer of the plurality of computers for storage of the generated intermediate data at local memory such that a variance of the computer usage demand across the plurality of computers is minimized.

11. The system of claim 10, wherein scheduler is configured to select the target computer of the plurality of computers having the lowest computer usage demand.

12. The system of claim 10, an application profile configured to provide the data manager a communication pattern of the generated intermediate data, the communication pattern specifying usage of the generated intermediate data by task and runtime.

13. The system of claim 12, wherein the communication pattern is a directed acyclic graph.

14. The system of claim 10, wherein the computer manager is further configured to normalize the computer usage demand based on computing resources available at each computer in the plurality of computers.

15. The system of claim 14, wherein the computing resources include, at least one of, memory size and amount of processing cores.

16. The system of claim 10, further comprising:
   an application profile configured to provide the scheduler a communication pattern of the generated intermediate data, the communication pattern specifying usage of the generated intermediate data by task and runtime; and
   wherein the scheduler is configured to select one or more of the plurality of computers having a plurality of processing cores if the generated intermediate data is consumed simultaneously by a plurality of tasks.

17. The system of claim 10, further comprising:
   an application profile configured to provide the scheduler a communication pattern of the generated intermediate data, the communication pattern specifying usage of the generated intermediate data by task and runtime; and
   wherein the scheduler is configured to select one or more of the plurality of computers to store the generated intermediate data and other intermediate data together if the generated intermediate data is consumed simultaneously with the other intermediate data by one single task.

18. A computer program product for distributing intermediate data of a multistage computer application to a plurality of computers, the computer program product comprising:
   a non-transitory computer readable storage medium having computer readable program code embodied therewith, the computer readable program code configured to:
      calculate a data usage demand of a generated intermediate data, the data usage demand being proportional to the number of consuming tasks in the multistage computer application configured to consume the generated intermediate data and, for each consuming task, discounted by a distance between a current stage of the multistage computer application and a future stage of the multistage computer application executing the consuming task;
      calculate a computer usage demand for each computer in the plurality of computers, the computer usage demand being a sum of all data usage demand of each intermediate data stored in local memory at the computer; and
      store the generated intermediate data at local memory of at least one target computer of the plurality of computers such that a variance of the computer usage demand across the plurality of computers is minimized.

19. The computer program product of claim 18, wherein the program code to store the generated intermediate data includes program code to store the generated intermediate data at the at least one target computer having the lowest computer usage demand.

20. The computer program product of claim 18, further comprising program code to receive a communication pattern of the generated intermediate data, the communication pattern specifying usage of the generated intermediate data by task and runtime.

* * * * *